Feb. 6, 1968           D. D. MANGIERI           3,367,328

FULL PRESSURE SUIT ACTIVATION SYSTEM WITH EJECT CAPABILITIES

Filed Feb. 24, 1965           6 Sheets-Sheet 1

INVENTOR.
DANIEL D. MANGIERI

BY

Lawrence S. Epstein
ATTORNEYS

INVENTOR.
DANIEL D. MANGIERI

Fig. 3

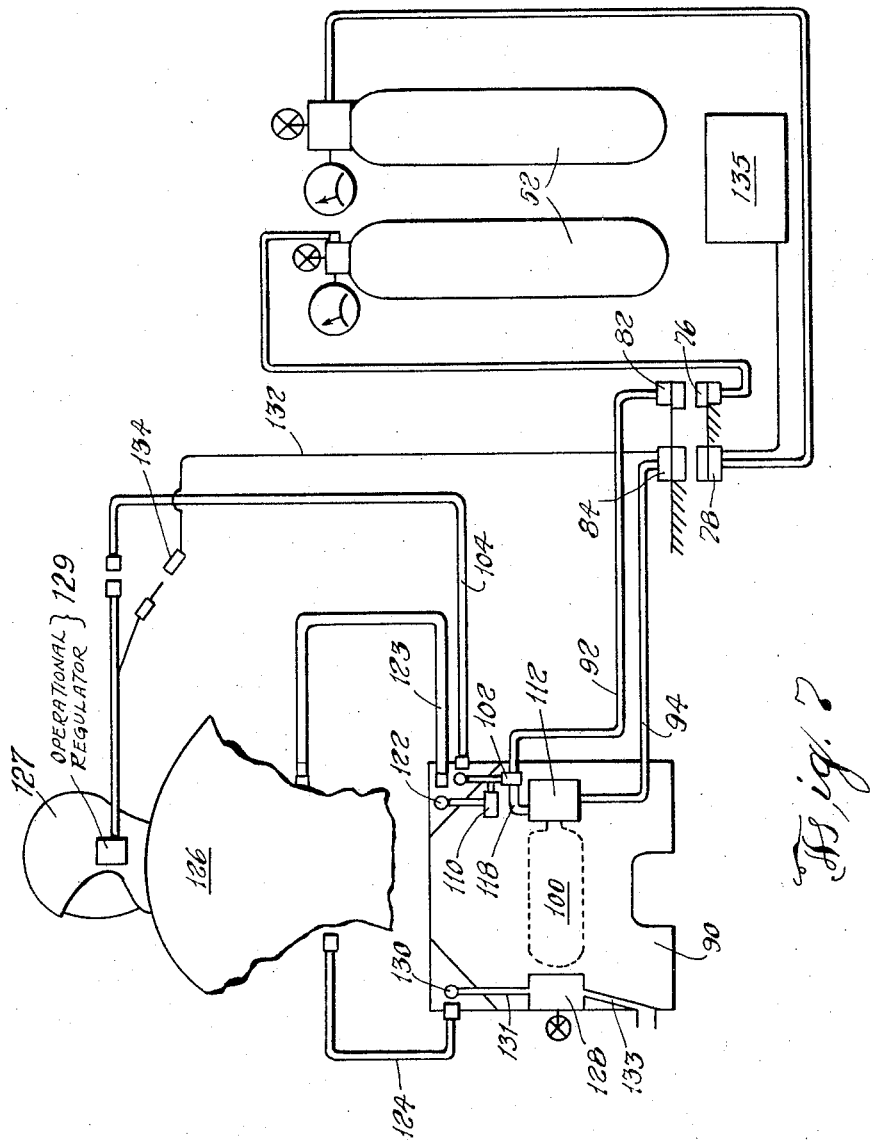

3,367,328
FULL PRESSURE SUIT ACTIVATION SYSTEM WITH EJECT CAPABILITIES
Daniel D. Mangieri, Commack. N.Y., assignor to the United States of America as represented by the Secretary of the Navy
Filed Feb. 24, 1965, Ser. No. 435,097
4 Claims. (Cl. 128—142.5)

ABSTRACT OF THE DISCLOSURE

A system for supplying air pressure to a pressure suit and breathing mask of the demand type in an ejection training device which includes a simulated cockpit structure and a seat which is movable with respect to the cockpit structure to simulate ejection of a seat from an aircraft cockpit, said system comprising an air pressure manifold mounted on the cockpit structure and having a plurality of outlets, means for supplying said manifold with air at a predetermined high pressure, a first pressure reducing regulator valve connected to one of said manifold outlets to receive air at said high pressure, said pressure reducing valve providing air at a first reduced pressure, a second pressure reducing regulator valve, first conduit means connected to said first regulator valve for conveying air at said first reduced pressure to said breathing mask and to a second pressure reducing regulator valve, said second pressure reducing regulator valve providing air to said pressure suit at a second reduced pressure which is less than said first reduced pressure, second conduit means including a rate of flow restrictor connected to another of said manifold outlets and communicating with air pressure storage bottles mounted on said seat for storing air at said high pressure, the first and second conduit means each including a separable connector having two parts separable in response to movement of the seat to simulate ejection and each including check valve means to prevent loss of air while separated, a third pressure reducing regulator valve connected to receive air at said high pressure from said storage tank and to provide at its outlet air at a third reduced pressure which is less than said first reduced pressure and greater than said second reduced pressure, a check valve connected between the outlet of said third regulator valve and said first conduit means, said check valve being oriented to permit flow from the storage tank to the mask and third regulator valve when the parts of said separable connectors are separated, and a vent valve mounted on the seat for venting air from the pressure suit at a manually selected rate when the seat is in normal position in the cockpit structure and which is closed automatically when the seat moves to simulate ejection.

---

The invention described herein may be manufactured and used by or for the Government of the United States of America for governmental purposes without the payment of any royalties thereon or therefor.

This invention relates to an ejection seat trainer and particularly to a full pressure suit activation device utilized in conjunction with the trainer.

The ejection seat trainer 10, illustrated in FIG. 1, provides a realistic and efficient means of training pilots in the correct procedure and characteristics of seat ejection from planes. It promotes confidence by acquainting pilots with the sensations of cartridge-powered seat ejection under conditions of optimum safety. The cockpit, seat, and controls simulate or duplicate the physical dimensions and shapes of airborne equipment. The cockpit mockup 12 simulates controls and obstructions which the student must operate or avoid to eject successfully and without injury from an airborner cockpit; the trainer's obstructions yields safely and provide visual and audible signals if struck. Switches actuate signals on the instructor's panel as the student performs each step of the ejection procedure, enabling the instructor at all times to monitor the correctness and progress of the training procedure. The instructor, by means of switches on his panel, can at any time prevent the student from ejecting or can secure all power to the trainer. The location of the instructor's panel is such that the instructor at the panel and the student seated in the ejection seat are within view of and facing each other.

When the student 14 has followed the required procedural steps in preparing to eject, and the instructor, monitoring the instructor's panel and watching the student's movements, has satisfied himself concerning the correctness of the procedure, a catapult safety device is released by the instructor 16. This action enables the student's final move to cause an ejection cartridge to be fired. Seat and student are ejected upward, out of the cockpit, along the tower guide rails 20. The device produces a maximum seat travel of about 15 feet, and subjects the student to less than half the g force which he would experience in an actual airborner ejection. The elevated tower 18 contains the guide rails 20. The descent of the seat down the tower guide rails is powered by gravity, controlled by mechanical governors, and is cushioned by a hydraulic-pneumatic seat catch system.

In addition, the Ejection Seat Trainer provides breathing and ventilation-air sources, controls and fittings so that the seat ejection training may be accomplished with the student clothed in his Mark IV Full Pressure Suit. When the student wears his full pressure suit and he is seated in the ejection seat prior to ejection, he is provided with breathing and ventilation air from an air compressor, and maintains voice communication with the instructor through integral inter-communication equipment. By manipulation of a manually-operated vent-exhaust control valve, the instructor may control the pressurization of the full pressure suit from zero p.s.i.g. to 3.5 p.s.i.g. This control by the instructor enables him to simulate for the student any corresponding pressure to which the student would be subjected in the event of partial or complete loss of cabin pressurization at any altitude from 35,000 feet to 100,000 feet. Pressurization of the suit is an important feature of the training procedure because pressurization of the suit makes the student's movements more cumbersome. By acquainting himself with the sensation and exertions he must experience to accomplish the ejection procedure while subjected to pressurization of the suit, the student gains confidence in his ability to successfully complete the procedure. Upon ejection, the student is automatically disconnected from the simulated aircraft's breathing air and ventilation air source, i.e., the training device's air compressor.

A structural-steel base 22 bears the elevated tower 18 together with the seat which moves along the tower. The base functions as a strong, stable and level foundation when raised on its self-contained leveling jacks and when counterbalanced by spreading out its trail beams 24 to form a configuration. Heavy, self-contained casters 26 provide the base with mobility, and the outspread trail beams can be folded inward to reduce the overall width of the unit and increase its maneuverability. A plumb bob suspended from the tower and hanging over an inscribed plate affixed to the base, makes apparent at all times whether or not the base is truly level.

The tower 18 which functions as a guide track for the ejection seat which moves along the tower, is constructed from two steel channels assembled into a strong and rigid box section. It is hinged to the base so that it can be lowered to a horizontal position on the base for moving or storage, or can be raised to an angle of 73½ degrees and braced with steel tubes so as to offer an inclined track for travel of the ejection seat 28 (see FIG. 5). Along the length of the tower are mounted the two steel rails which guide and hold captive the seat sled and seat, and two steel racks which engage spur-geared governors mounted on the seat sled. The tower also acts as a frame to support a friction-type safety brake (not shown) to stop the seat should the seat overshoot its designed 15 foot travel up the tower. The tower also supports a pneumatic-hydraulic system seat catch which engages and stops the descending seat.

The cockpit 12 functions as a frame for seat and student, and as a support for an access ladder, mounting platforms, rudder-pedal mockup, and devices such as throttle, emergency canopy release, and a simulated control stick.

It is an important object of the invention to provide full pressure suit capabilities for a pilot in order to train him under simulated conditions to experience the identical conditions in case of operational ejection from a plane.

It is another object to provide air under pressure to a pilot trainee when he is ejected from an aircraft under simulated conditions.

It is still another object to provide a quick disconnect means between the ejection tower and the ejection seat so that a supply of oxygen air is provided for the period after ejection to simulate actual conditions of when the pilot is out in space, free of his aircraft.

It is yet another object to provide a constant supply of air under pressure to a storage source, so that it will be unnecessary to dismantle the training equipment and to replace exhausted supplies of air.

And it is another object to control the air under pressure so that the pressures utilized in actual operational performance are duplicated.

And it is still another object to provide a device which is compact in construction, since the space that may be utilized to provide the training equipment is limited.

It is yet another object to provide a two-way communication system between the instructor and the student where the freedom for the use of the hands is maintained.

Other objects and many of the attendant advantages of this invention will be readily appreciated as the same becomes better understood by reference to the following detailed description when considered in connection with the accompanying drawings wherein:

FIG. 3 is a schematic illustration illustrating provision of compressed air in the system;

Figure 4:
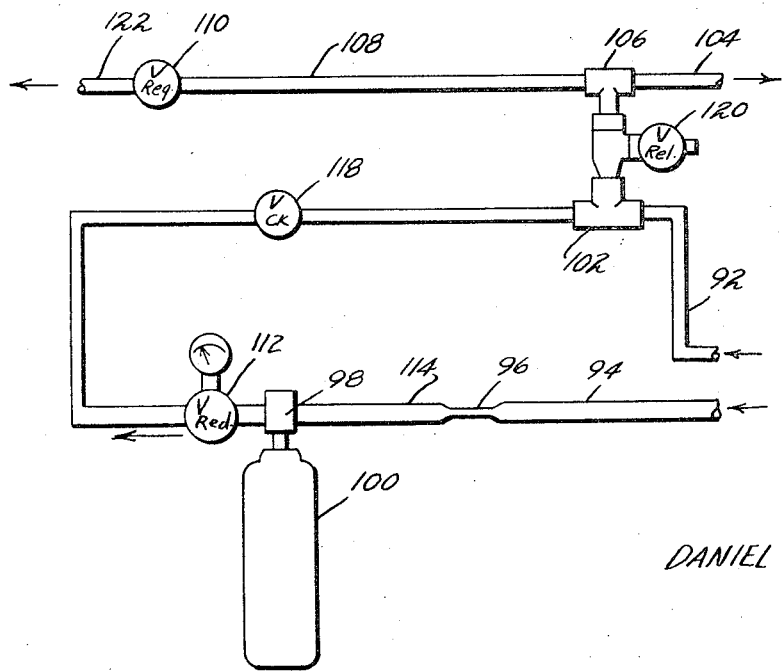
Figure 5:
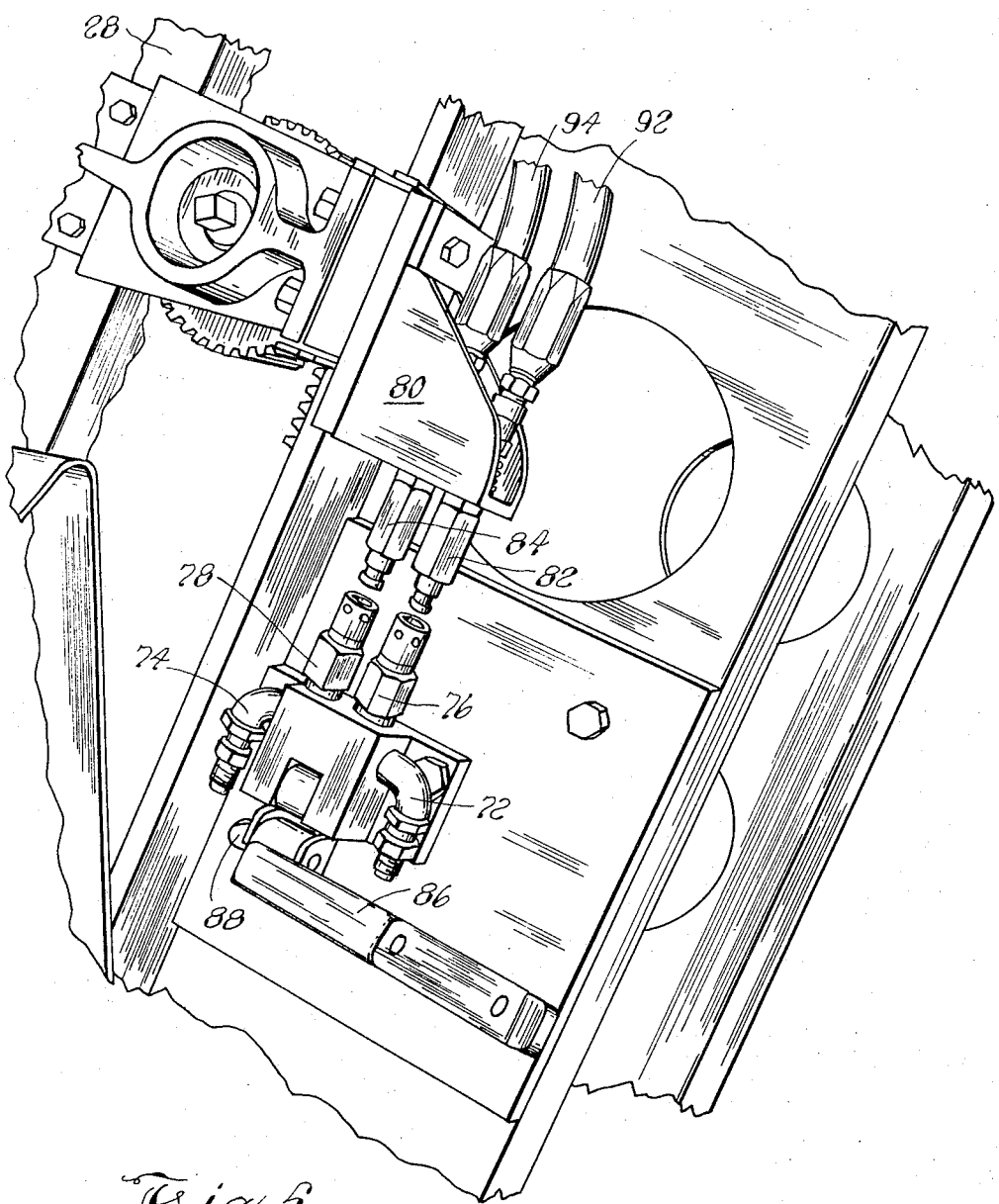
Figure 6:
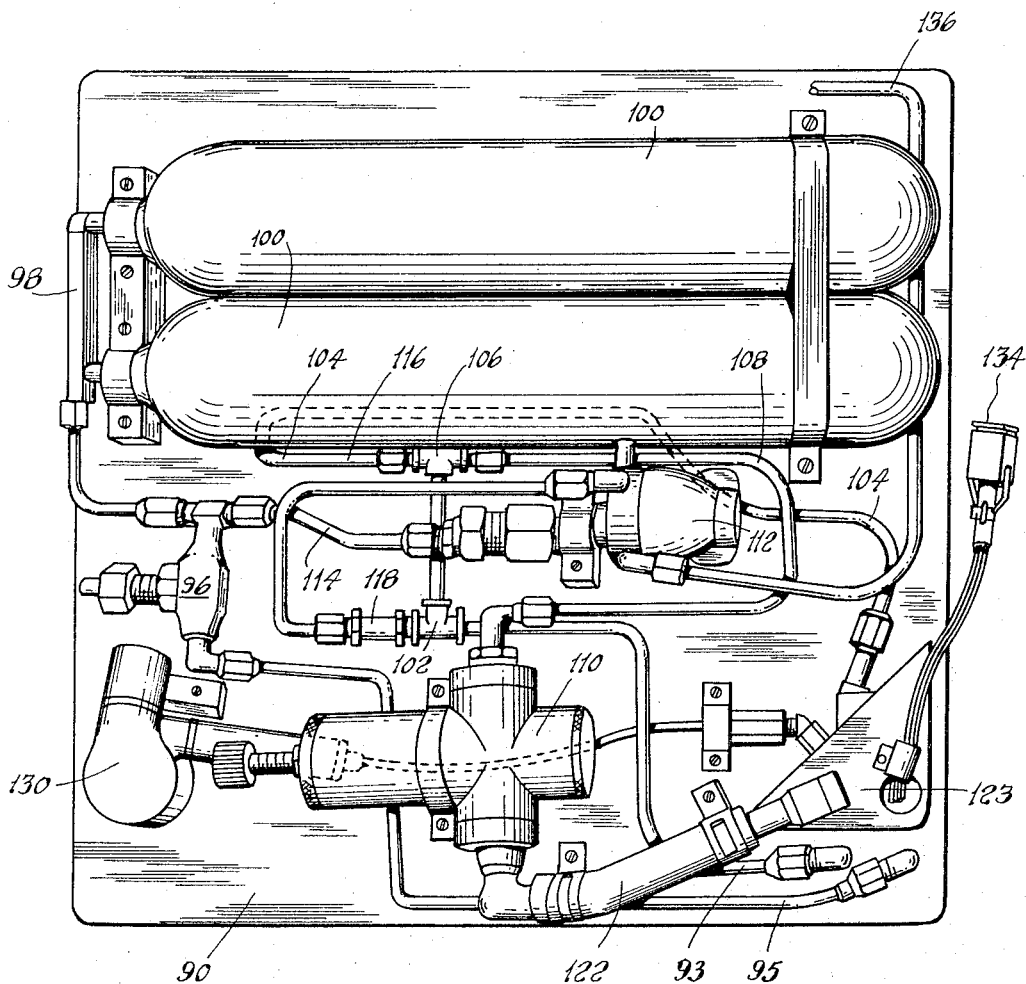

FIG. 4 schematically illustrates the full pressure suit capability in the seat;

FIG. 5 illustrates the quick disconnect and compressed air cut-off construction;

FIG. 6 shows the seat pan and pressure suit capability as actually constructed; and FIG. 7 schematically follows the provision of air to the pilot and to his pressure suit.

Figure 1:
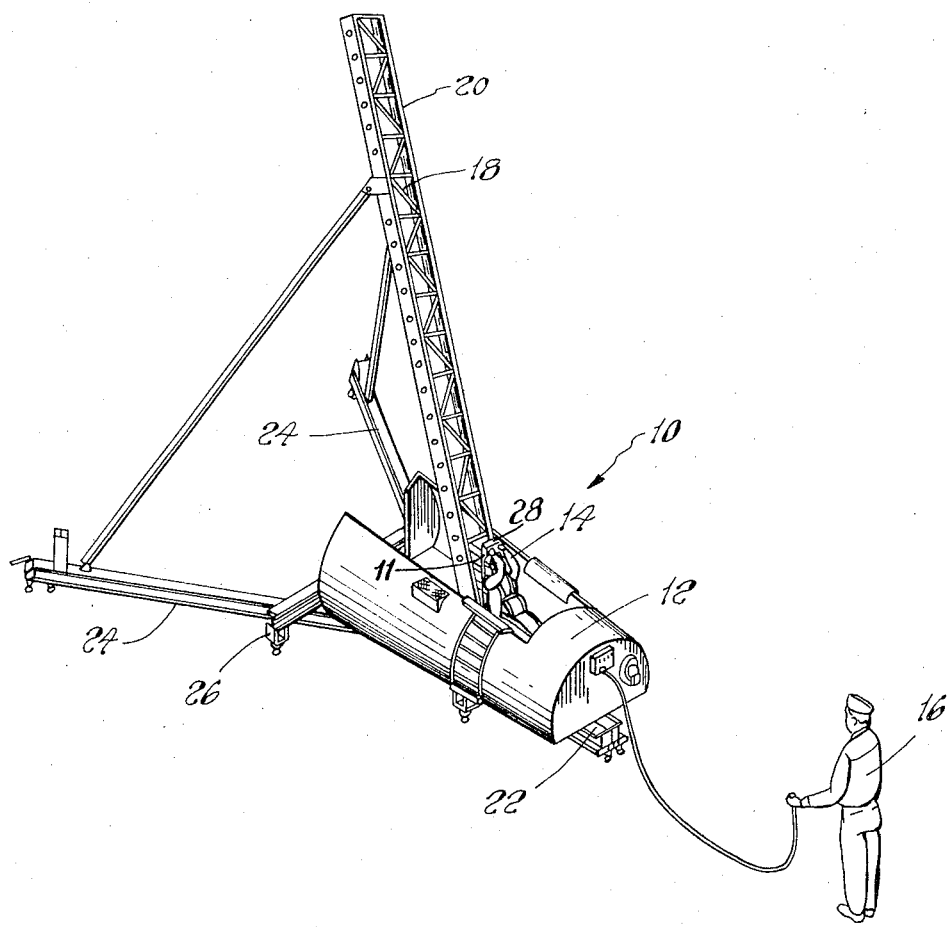
FIG. 1 is a perspective view of an ejection seat trainer in use today.
Figure 2:
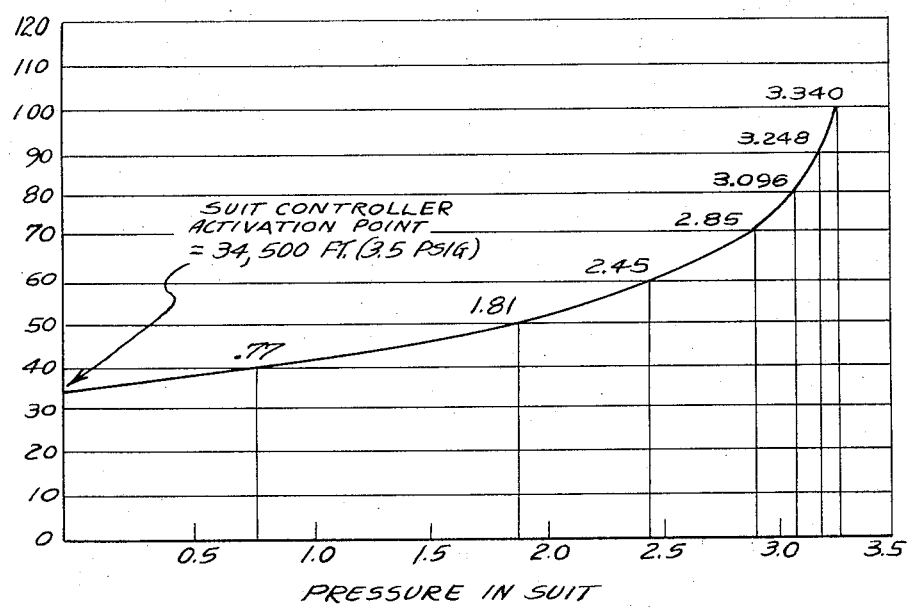
FIG. 2 is a graph showing the relationship of compressed air requirements for a pressure suit with relation to altitude.

A cabin is pressurized and is ordinarily maintained at 5–15 p.s.i. When cabin pressure is lost, the occupants are subjected to the ambient pressure corresponding to the altitude of the aircraft. To survive, man must have at least 3.0 p.s.i. of pure oxygen. Since oxygen comprises roughly twenty percent of air, (the other inert compounds not being material here), 3.0 p.s.i. of pure oxygen is the equivalent of 15 p.s.i. of air. Thus, at 35,000 feet altitude, 100% pure oxygen is equal to 3 p.s.i. In FIG. 2, a curve illustrating the increase of pressure in the suit as the altitude rises over 35,000 feet, is shown. At 35,000 feet, no pressure in the suit is required. However, at 40,000 feet, about 0.77 p.s.i. is required, and so on until at a maximum altitude of 100,000 feet, a pressure of 3.34 p.s.i. is required. Thus, the pressure suit of the pilot provides differential pressure between ambient pressure and 3.5 p.s.i.g.

When the student utilizes his pressure suit in the training for ejection, he leaves the pressurized cockpit 12 in his ejection seat and now must be provided with air while in space, to survive.

During the captive ascent and descent of the ejection seat up and down the tower, the student is furnished with air for breathing from two bailout-oxygen bottles contained in the seat pan of the ejection seat. Because the capacity of the bailout-oxygen bottles is limited and must be conserved, the vent-exhaust valve 128 is closed by means of a lanyard (not shown) to automatically close upon ejection of the seat, resulting in stoppage of ventilation with consequent maximum pressurization of the suit during ejection. The invention about to be described provides the necessary oxygen and suit pressurization.

The ejection seat trainer, may be employed with or without full-pressure-suit activation. To enable full pressure suit activation, an air compressor assembly is furnished as an integral part of the device. The air compressor assembly furnishes compressed air for ventilation, pressurization, and breathing through a 90 p.s.i. air hose and through an 1800 p.s.i. air hose. Regulators and fittings contained within the seat pan of the ejection seat receive compressed air from the compressor assembly during such times as the seat is in pre-ejection position, and feed the air, via hoses from seat pan to the full pressure suit. The seat pan also contains bailout-oxygen bottles which receive and store 1800 p.s.i. air from the compressor when the seat is in pre-ejection position. When the seat is ejected up the tower, the seat is separated from the compressed air couplings through which it formerly received air from the compressor, and at that time and during the remainder of ejection the compressed air bottles within the seat pan furnish the required pressurization and breathing air. To conserve the limited supply of air in the bailout-oxygen bottles 10, the ventilation-exhaust valve 128 in the seat pan, to which the vent-exhaust hose from the suit is connected, is caused to automatically close by means of a lanyard (not shown) if not manually closed prior to ejection. This results in stoppage of ventilation through the suit during ejection, and use of the air solely for breathing and pressurization. Used thusly, the supply of air in the bottles will last approximately five minutes. For reasons of safety, economy and practicability, compressed air is used for full-pressure-suit activation rather than aviator's breathing oxygen.

Figure 3:
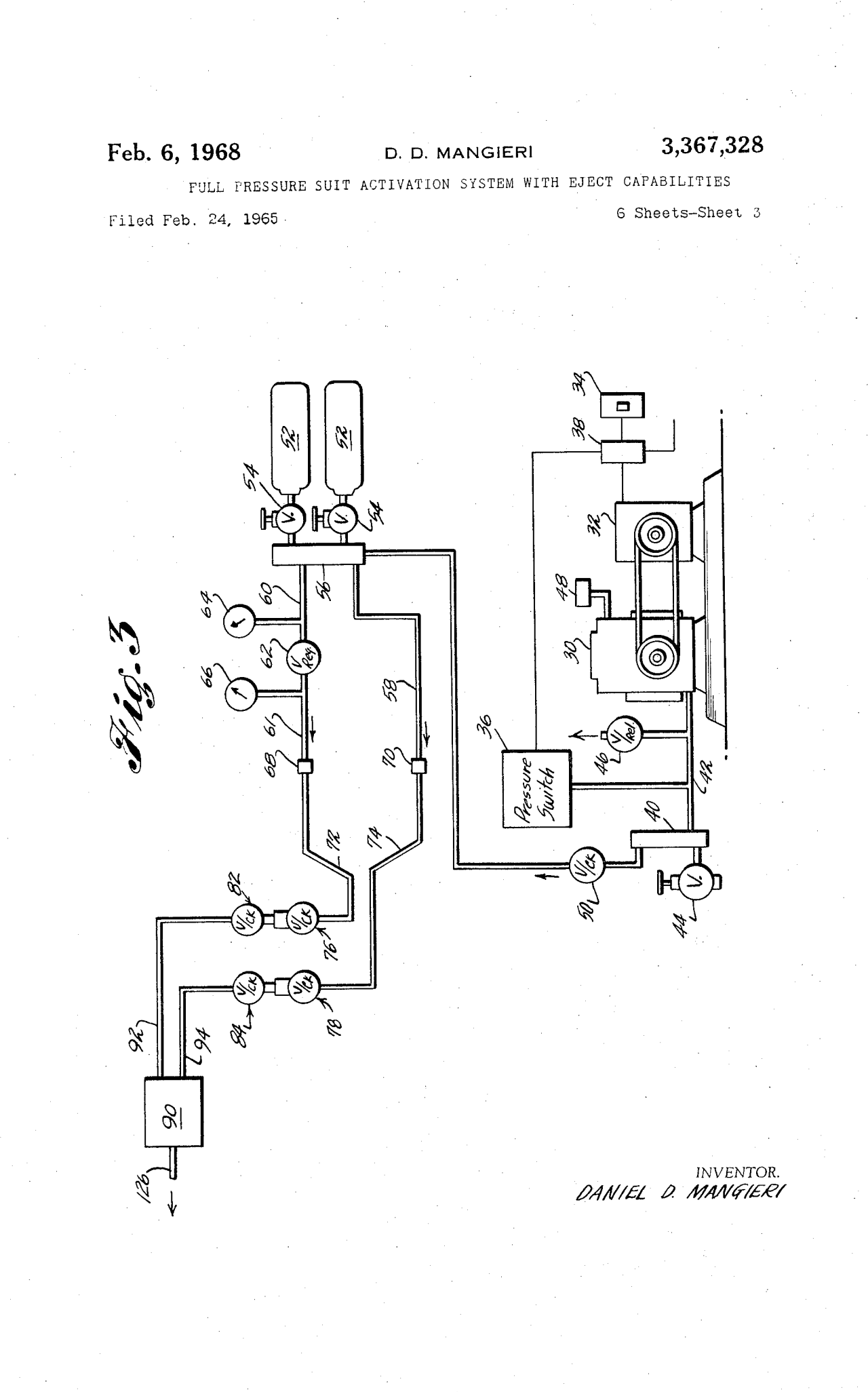

The air compressor 30 (FIG. 3) is a three-stage, air-cooled, 1500 r.p.m., 3.5 c.f.m., 2200 p.s.i.g. reciprocating-type unit driven by twin V-belts from a 3 h.p., 1750 r.p.m., 110 volt, single-phase 60-cycle capacity-start induction-run electric motor 32 drawing a maximum current of 34 amperes. Electrical power input to the motor's magnetic controller 38 is controlled by a START-STOP toggle switch 34. A pressure switch 36 in the air-discharge line of the air compressor is electrically connected to the magnetic controller 38 and automatically stops the air compressor when the discharge pressure reaches 1800 p.s.i.g. and restarts the compressor when the pressure falls to 1400 p.s.i.g. A contaminants discharge filter 40 in the air compressor discharge line 42 ensures delivery of oil-free and clean air to the pressure suit. A bleeder valve 44 at the bottom of the discharge-air filter is installed for starting-up the compressor, and relieving moisture and oil; it is manually opened when starting the compressor and closed after starting. The relief valve 46 acts as a safety and the inlet filter 48 cleans incoming air. A check valve 50 immediately downstream of the filter 40 prevents any high-pressure air remaining in the accumulator tanks 52 from a previous operation from escaping through the bleeder valve 44 when the valve is opened. Two air accumulator tanks 52 act as a reservoir and surge tank for the discharge air; each tank is provided with a separate shutoff valve 54 which, during operation, must remain normally open. The air inlet line from the compressor 30, the accumulator tanks 52, and high pressure outlet lines 58 and 60 (FIG. 3), are all connected to a common manifold 56. The manifold feeds directly into the 1800 p.s.i. line 58, and also provides 1800 p.s.i. air via the line 60 to the inlet of a 90 p.s.i. regulator 62. The regulator is a standard oxygen-type regulator, with integral inlet (high pressure) gage 64 and outlet (low pressure) gage 66. Hose connectors 68 and 70 are fitted in the 90 p.s.i. line 61 immediately past the 90 p.s.i. regulator 62, and in the 1800 p.s.i. line 58 after the manifold 56. Two flexible hoses 92 and 94, color-coded to identify the 90 p.s.i. hose 92 from the 1800 p.s.i. hose 94, are provided with the assembly. These hoses are used to connect the air compressor assembly to female couplings 76 and 78 attached to the tower 18; the couplings of the tower connector have integral check valves within them so that if the air compressor hoses are disconnected, compressed air will not back-flow from the seat pan 90 and escape to the atmosphere.

As is shown in FIG. 5, permanently affixed on L-brackets to the left-side of the tower 18 near the cockpit (not shown) are the two female coupling-body assemblies 76 and 78 with integral check valves. The 90 p.s.i. hose 92 and the 1800 p.s.i. hose 94 from the air compressor assembly are connected, when full-pressure-suit activation is prepared for, to their respective couplings; the female ends of the couplings 76 and 78 remain exposed. On the seat sled is affixed an L-bracket 80 containing two male coupling nipple assemblies 82 and 84 which mate with the exposed female couplings 78 and 76 on the tower when the instructor manually employs the connect lever 86 and the cam 88 in the pre-ejection position. Like the couplings on the tower, the couplings on the sled also contain integral check valves within themselves. When the seat is ejected and rises, causing the seat connector couplings 84 and 82 to disengage from the tower connector couplings 78 and 76, the check valves in the couplings close, and so compressed air stored in the bailout-oxygen bottles 100 (see FIG. 6) within the seat pan 90 will not escape to the atmosphere through the parted couplings of the sled. The sled couplings are connected by hose 92 for 90 p.s.i. air and by hose 94 for 1800 p.s.i. air to the seat pan fittings 93 and 95 (see FIG. 6).

The functions of the bottles, valves, fittings and gages contained within the seat pan 90 of the ejection seat are: (1) to store air within oxygen-bailout bottles to provide breathing and pressurization air to the full pressure suit when the seat is separated from the air compressor assembly during ejection; (2) to provide air at a reduced pressure of approximately 5 p.s.i. for ventilation of the full pressure suit during pre-ejection; (3) to provide breathing air at between 40 and 90 p.s.i. to the helmet of the suit; (4) to provide a means, by a manually controlled valve, of manually controlling the flow of ventilation-exhaust air exhausting from the suit and so controlling the suit pressurization; and (5) to provide electrical connection between the communication line from the suit helmet to the communication kit, via the instructor's panel.

As is best shown in FIGS. 4 and 5, the 1800 p.s.i. hose 94 from the seat-tower connector 84 supplies high-pressure charging air, through a check valve (not shown) in the fitting 84 and a flow reducer 96 FIG. 4, and via the manifold 98, to two bailout-oxygen bottles 100 in the seat pan 90 (FIG. 6). The flow is so restricted as the air under pressure would otherwise heat the bottles and possibly rupture them. The 90 p.s.i. hose 92 from the seat-tower connector is coupled, inside the seat pan 90, to a T connection 102. If the pressure within the seat bottles 100 via the reducer 112 is less than the pressure entering from the 90 p.s.i. hose 92, the 90 p.s.i. air will flow upstream of the check valve 118 into a T-coupling 106 to which are connected a hose 104, which supplies 90 p.s.i. air to the face mask of the full pressure suit 126 (FIG. 7), and a length of tubing 108 (FIG. 4) which supplies the 90 p.s.i. air to the inlet of the 5 p.s.i. vent-input regulator 110. The 1800 p.s.i. air stored within the seat bottles 100 is received via the tubing 114 and is reduced in pressure by a 40-60 p.s.i. pressure reducing regulator 112 located at the charging connection of the seat bottle 100. From the reducing valve 112 air passes to the downstream side of the check valve 118 in the 90 p.s.i. T connection. As long as the pressure in the 90 p.s.i. tubing 92 upstream of the check valve 118 is greater than the 40-60 p.s.i. pressure reduced from the 1800 p.s.i. bottle air downstream of the check valve 118, the check valve will stay closed and no air will flow from the seat bottles. On the other hand, upon ejection, when the hoses 72 and 74 (FIG. 3) from the air compressor are disconnected, the 90 p.s.i. pressure from the air compressor is lost. Then, the 40-60 p.s.i. pressure reduced from the high-pressure air contained in the bottles 100 will open the check valve 118 and flow onto the second T 106 connection to supply the helmet 127 (FIG. 7) through hose 104 and the vent-input regulator 110 (FIG. 4) through the tubing 108. The air will not escape to the atmosphere through the 90 p.s.i. and the 1800 p.s.i. hoses 92 and 94 disconnected at the tower because the couplings 84 and 82 of these hoses on the seat sled contain check valves within themselves. A relief valve 120 (FIG. 4) is installed on the upstream side of the check valve 118 between the 90 p.s.i. input-and-output T's 102 and 106. The relief valve 120 will relieve excessive pressure (120 p.s.i.) passing through the check valve 118 from the seat bottles 100 in the event the 40-60 p.s.i. regulator is incorrectly adjusted or malfunctions, or if excessive pressure is admitted to the 90 p.s.i. hose 92, thus protecting the helmet 127 and operational regulator 129 from damaging pressures. The regulator 110 (FIG. 6) connects to a large hose 122 which leads to the pilot's suit 126, through a quick disconnect block member 123 (see FIGS. 6 and 7).

The vent exhaust hose 124 (FIG. 7) from the suit 126 mates with vent exhaust fitting 130 which lends into the seat pan 90. A hose 131 inside the seat pan is connected to a manual gate valve 128 which opens to the atmosphere through a port 133 in the side of the seat pan. When this valve, referred to as the vent-exhaust control valve 128, is fully open, the air within the suit is permitted to exhaust freely to the atmosphere, and no pressure can build up within the suit except for a very small pressure due to the resistance of the suit itself to air flow. A low-pressure gage (not shown) mounted on the seat pan adjacent to the vent-exhaust control valve 128 indicates the pressure in the vent exhaust 131, with the valve fully open, the suit-pressure gage will indicate zero p.s.i.g. When the valve is fully closed, air cannot exhaust from the suit, and the pressure within the suit will build up to a maximum to 3.5 p.s.i.g. By manipulating the valve 128 to any degree of closure between fully open and fully closed, the pressure in the suit may be maintained at any desired pressure between zero p.s.i.g. and 3.5. p.s.i.g. By this means, the suit may be pressurized to simulate any differential pressure to which the student would be subjected by ambient pressure on his suit at any altitude between 34,000 and 100,000 feet.

Contained within the seat pan 90 is an electrical lead 132 which extends up through the seat and terminates in an electrical disconnect for connection to the communication line 134 from the full pressure suit 126. The other end of the lead 132 passes out through the seat and terminates in an electrical quick-disconnect (not shown) on the seat sled which mates with an electrical disconnect (not shown) on the tower (not shown) when the seat is in its pre-ejection position. When the seat is ejected and the electrical disconnects are separated, voice communication between student and instructor is terminated.

A self-contained transistorized dual-channel amplifier 135 is used for voice communication between the trainee and the instructor. The amplifier is powered by a nine-volt dry cell battery (not shown). The communication amplifier 135 is energized by means of an ON-OFF switch (not shown) ganged to the volume control of the incoming channel. No warm-up period is required to place the amplifier into operation. The instructor is provided with a two-way system (not shown) which he may utilize without requiring manual manipulation. This leaves his hands free for operational instruction of the trainee.

In operation, a pilot 14 is seated in an ejection seat trainer 10 preparatory to being ejected. He pulls the face curtain 11 over his head and when the cartridge is fired, he is ejected upward, free of the cockpit 12, in a realistic manner. However, his seat travels upwardly on the rails 20. When this occurs, the connectors 82, 84 disconnect from the fixed connectors 76, 78, as is illustrated in FIG. 5.

Prior to this step, compressed oxygen or air at 1800 p.s.i. has been supplied to the storage tanks 100 via the hose 74. Compressed air at 90 lb. p.s.i. has been supplied to the T-valve connector 102 via the tubing 72. The air from the storage tanks 100 is also supplied to the T-connector 102, but is reduced prior to entry, to about 60 p.s.i. by the reducing valve 112. When the pilot has been ejected, the valves 76, 82 and 78, 84 are disconnected, and the supply from the hose 92 to the T-connector 102 is cut off. This causes the air at 60 p.s.i. to flow through the T-connector 102 to the distributor T 106. From the T 106, air is sent to the pilot's helmet 127 via the line 104 and to the pressure suit 126 via the line 123. It is desirable to circulate the air through the pressure suit, and this is accomplished through the line 124. A low pressure gage (not shown) is provided in the seat adjacent to the pilot so that the instructor may see the pressure on the vent line, the conduit 136 (see FIG. 6) on the seat pan 90 being connected to the reducing valve 112 and leading to the pressure gage. The communication line 134 permits communication between the instructor and the student until ejection.

Obviously many modifications and variations of the present invention are possible in the light of the above teachings. It is therefore to be understood that within the scope of the appended claims the invention may be practiced otherwise than as specifically described.

What is claimed is:

1. A system for supplying air pressure to a pressure suit and breathing mask of the demand type in an ejection training device which includes a simulated cockpit structure (12) and a seat (90) which is movable with respect to the cockpit structure to simulate ejection of a seat from an aircraft cockpit, said system comprising:
   an air pressure manifold (56) mounted on the cockpit structure and having a plurality of outlets;
   means for supplying said manifold with air at a predetermined high pressure;
   a first pressure reducing regulator valve (62) connected to one of said manifold outlets to receive air at said high pressure, said pressure reducing valve providing air at a first reduced pressure;
   a second pressure reducing regulator valve (110);
   first conduit means (68, 72, 76, 82, 92, 102, 106, 104, 108) connected to said first regulator valve for conveying air at said first reduced pressure to said breathing mask and to said second pressure reducing regulator valve; said second pressure reducing regulator valve providing air to said pressure suit at a second reduced pressure which is less than said first reduced pressure;
   second conduit means (58, 70, 74, 78, 84, 94, 96) connected to another of said manifold outlets and communicating with air pressure storage means (100) mounted on said seat for storing air at said high pressure;
   said first conduit means including a separable connector having two parts (76, 82) separable in response to movement of said seat to simulate ejection and each including check valve means to prevent loss of air while separated;
   said second conduit means including a separable connector having two parts (78, 84) separable in response to movement of said seat to simulate ejection and each including check valve means to prevent loss of air while separated;
   a third pressure reducing regulator valve (112) connected to receive air at said high pressure from said storage means and to provide at its outlet air at a third reduced pressure which is less than said first reduced pressure and greater than said second reduced pressure; and
   a check valve (118) connected between the outlet of said third regulator valve and said first conduit means, said check valve being oriented to permit flow from the storage tank to the mask and third regulator valve when the parts of said separable connectors are separated.

2. A system as defined in claim 1 and wherein:
   said second conduit means comprises a flow restrictor (96) for limiting the rate of flow of said high pressure air into said storage means upon mating of the parts of said separable connectors.

3. A system as defined in claim 2 and further comprising:
   adjustable valve means (128) mounted on said seat and operable to vent air from said pressure suit while said separable connectors are connected.

4. A system as defined in claim 3 and wherein:
   said vent valve means includes lanyard means for automatically closing said vent valve means in response to movement of said seat to simulate ejection.

References Cited
UNITED STATES PATENTS
| | | | |
|---|---|---|---|
| 2,824,557 | 2/1958 | Mejean et al. | 128—142.3 |
| 2,929,377 | 3/1960 | Cummins | 128—142.5 |
| 3,077,881 | 2/1963 | Sprague | 128—142.5 |
| 3,103,927 | 9/1963 | Henneman et al. | 128—142.5 |
| 3,286,373 | 11/1966 | Mangieri | 35—12 |

FOREIGN PATENTS
| | | |
|---|---|---|
| 856,547 | 12/1960 | Great Britain. |

RICHARD A. GAUDET, Primary Examiner.

K. L. HOWELL, Examiner.